United States Patent [19]
Phillips

[11] Patent Number: 5,289,762
[45] Date of Patent: Mar. 1, 1994

[54] EGG EVACUATION APPARATUS

[76] Inventor: Bert Phillips, R.D. 1, Box 107G, Spring Mills, Pa. 16875

[21] Appl. No.: 712,665

[22] Filed: Jun. 10, 1991

[51] Int. Cl.$^5$ .................................................. A23B 5/00
[52] U.S. Cl. ........................................ 99/495; 15/343; 99/456; 99/532; 99/568; 99/584
[58] Field of Search .................. 99/472, 456, 495, 516, 99/532, 533, 538, 568, 567, 584; 30/120.1; 15/353

[56] References Cited

U.S. PATENT DOCUMENTS

| | | | |
|---|---|---|---|
| 2,224,941 | 12/1940 | Weimer | 99/485 |
| 2,445,490 | 7/1948 | Meade | 99/495 |
| 2,446,812 | 8/1948 | Cribb et al. | 99/472 |
| 2,449,941 | 9/1948 | Jauhiainen | 99/568 |
| 2,466,310 | 4/1949 | Gaylor | 99/568 |
| 2,594,619 | 4/1952 | Bosch et al. | 99/486 |
| 3,055,407 | 9/1962 | Conrad | 99/495 |
| 3,855,915 | 12/1974 | Hoyt et al. | 99/495 |
| 3,951,055 | 4/1976 | Woebbeking | 99/568 |
| 4,117,774 | 10/1978 | Wilburn et al. | 30/120.1 |
| 4,182,234 | 1/1980 | Reed | 99/495 |
| 4,246,676 | 1/1981 | Hallsworth et al. | 15/353 |

FOREIGN PATENT DOCUMENTS 2702157 7/1978 Fed. Rep. of Germany ........ 99/568

*Primary Examiner*—Timothy F. Simone
*Attorney, Agent, or Firm*—Lewis L. Lloyd

[57] ABSTRACT

The apparatus provides for evacuation of the egg yoke and egg white from an egg through one hole in the egg shell. An egg with one hole in the egg shell is positioned on the apparatus. The one hole in the egg shell is positioned over a hollow tube which extends into the egg. The hollow tube aligns an egg collection opening in an egg seal with the egg collection passageway and supplies air at atmospheric pressure into the egg. When the interior of a bottle has a pressure below atmospheric pressure from a vacuum cleaner the egg yoke and egg white flow into the bottle. In a second embodiment, the apparatus provides for both evacuation and flushing of an egg.

5 Claims, 2 Drawing Sheets

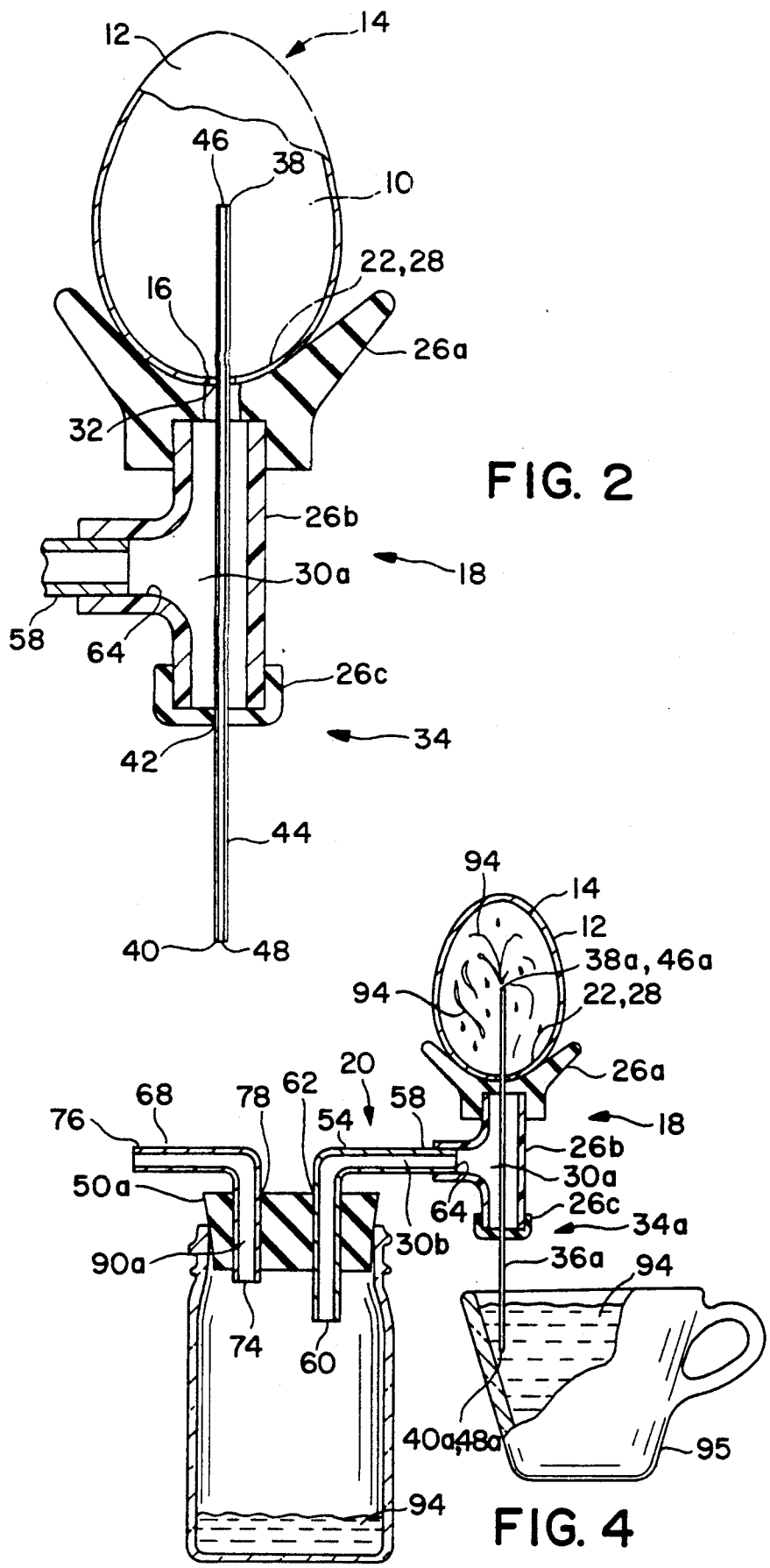

EGG EVACUATION APPARATUS

BACKGROUND OF THE INVENTION

This invention relates to an apparatus for evacuating an egg and particularly concerns an apparatus for evacuating the interior content of the egg through one hole in the egg shell. A second embodiment of this invention relates to an apparatus for evacuating and flushing the egg.

One prior U.S. Pat. No. 2,800,409 issued Jul. 23, 1957 describes equipment for extracting the content of an egg. This equipment includes a vacuum pump connecting by tubing to a container connecting by tubing to a valve mounting to a suction cup which holds the egg. The egg contains a top and a bottom hole, the bottom hole opens into the suction cup and the top hole opens to atmospheric air. This equipment has the disadvantage of requiring two holes in the egg shell. When the egg is used for decorative purposes one hole generally can be hidden from view by positioning it so it can not be easily seen. But, the second hole can be seen and detracts from the aestetic appearance of the decorative egg. The equipment appears to use an electric vacuum pump which is large in size and costly to purchase.

SUMMARY OF THE INVENTION

The invention is an apparatus for evacuating the interior content from an egg which requires only one hole in the egg shell. With only one hole in the egg shell, the invention provides an aesthic Easter, Christmas or other decorative egg. This is possible since the one hole in the egg shell can be positioned at the bottom of the egg shell or any other position where it will be hidden from view when the egg shell is used for decorative purposes.

The apparatus for evacuating the interior content from the egg shell of an egg through one hole in the egg shell includes a closure means for sealably mounting to a bottle, egg evacuation means for evacuating the interior content of the egg through the one hole in the egg shell, and egg collection means connecting from the egg evacuation means through said closure means.

The apparatus permits the use of a standard bottle or jar. Suitable bottles such as juice bottles and suitable jars such as jelly jars are readily available in most homes. In fact, extra bottles and jars also are available to permit the use of different bottles or jars as needed to collect and store the interior content of an egg for use. If desired, a separate bottle or jar also can be used to collect the water used to flush the interior of the egg shell. These bottles and jars are easy to clean and reuse.

The apparatus permits the use of a vacuum cleaner of the type having a hose as the source of the reduced pressure. This eliminates the need to obtain a costly electric vacuum pump.

The egg evacuation means of the apparatus for evacuating the interior content from the egg shell of an egg through one hole in the egg shell includes an egg seal connected with the egg collection means and having an egg collection opening therein for alignment with the one hole in the egg shell, and a hollow needle sealable mounted in the egg seal with one end opening within the egg collection opening and the other end opening external to the egg seal so that air at atmospheric pressure is provided through said hollow needle for filling the egg with air through the same one hole in the egg shell during evacuation of the interior content.

The egg seal provides for support of the egg and permits sealably positioning the egg with the one hole in the egg shell aligned with the egg collection opening. The hollow needle which enters the egg through the same one hole in the egg shell permits air fill of the egg shell during evacuation of the interior content.

In the second embodiment of the invention, the apparatus further includes flushing means for flushing with water the interior of the egg shell through the same one hole in the egg shell after the interior content has been evacuated.

The flushing means provides for flushing the interior surface of the egg shell with water to remove the residue of the interior content. Since the flushing means in the the second embodiment also uses a hollow needle, the water exiting the top of the hollow needle impinges on the interior of the egg shell with sufficient force to flush the residue from the interior of the egg shell. Since there is only one hole in the egg shell the flushing water and the interior content residue exit through the egg collection opening in the egg seal and flow through the egg collection passageway into the bottle. This invention in the second embodiment therefor provides both evacuation of the interior content and flushing with water.

It is important to clean the interior of the egg shell from residue of the interior content. This is particularly important where the egg shell is used for decorative purposes. The residue of the interior content which consists of the egg yoke and the egg white may spoil and cause the decorated egg to smell. This smell may make the decorated egg shell undesireable for any use and particularly undesirable for long term use and storage.

The apparatus is small-in-size and light-in-weight making it easy to package and display for sale on the shelves of a merchant. This small size also makes it simple to use. The cost is low as a result of the small size and light weight as well as the elimination of the requirement for a powered vacuum pump.

It should be noted that the contemplated principal purpose of the invention is a toy or amusement device with an utilitarian purpose. It is fun to decorate eggs for use as an Easter Egg or a Christmas Egg or a Birthday Egg or for just about any purpose. The evacuation of the interior content of the egg with the invention is also fun to watch and provides for the amusement and pleasure of both children and adults. These and other advantages are very apparent from the following description and drawings.

BRIEF DESCRIPTION OF THE DRAWINGS

FIG. 2 is an enlarged view of a portion of the apparatus of FIG. 1 illustrating the egg evacuation means.

FIG. 4 illustrates a second embodiment of the apparatus of FIG. 1 which provides for both evacuation of the egg and flushing of the empty egg shell.

DETAILED DESCRIPTION OF THE INVENTION

Figure 1:
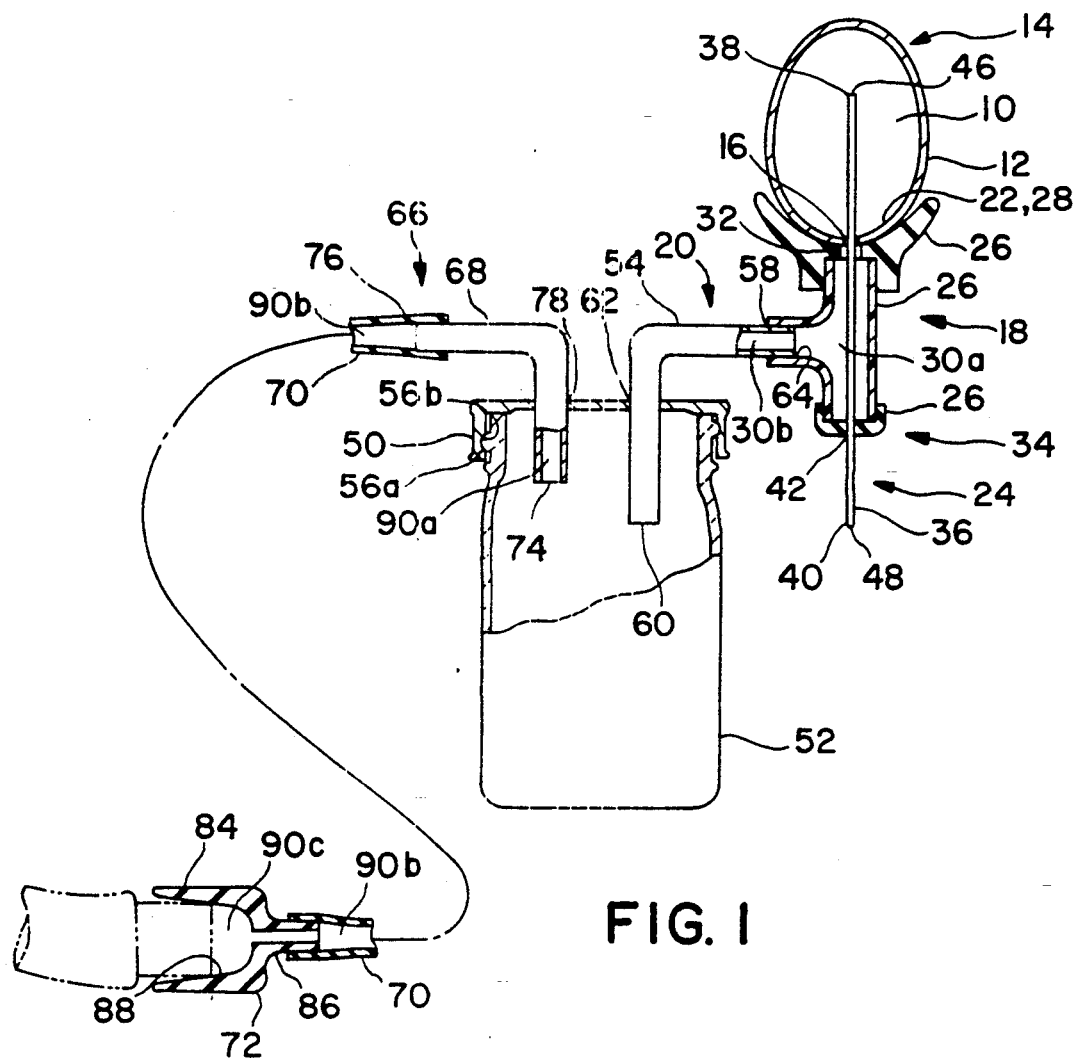
FIG. 1 illustrates the apparatus for evacuation of the interior content of an egg.

FIG. 1 illustrates the apparatus for evacuating the egg yoke and egg white or interior content 10 from the egg shell 12 of an egg 14 through one hole 16 in the egg shell 12.

The apparatus includes egg evacuation means 18 for evacuating the interior content 10 and egg collection means 20 for collecting the evacuated interior content 10. The egg evacuation means 18 includes an egg seal 22 and an air fill means 24. The egg seal 22 includes a first flexible housing portion 26a providing an egg sealing surface 28 for holding and sealing the egg 14 in the egg seal 22, a second T-shaped portion 26b and a third end cap portion 26c. The egg seal 22 includes a first portion 30a of the egg collection passageway 30. The first portion 30a ends at the egg collection opening 32 formed in the first flexible housing portion 26a of the egg seal 22.

The air fill means 24 includes a hollow needle means 34 mounted within the egg seal 22. The hollow needle means 34 includes a hollow needle 36 having an upper end 38 and a lower end 40. The hollow needle 36 is mounted through a hole 42 in the egg seal 22 with the upper end 38 extending through the egg collection opening 32 and the lower end 40 extending through the third end portion 26c of the egg seal 22 as shown in FIGS. 1 and 2. The hollow needle 36 has an outside diameter of about 0.060 inch, an inside diameter of about 0.040 inch and a length of about 4 inches. The hollow needle 36 is a rigid or semi-rigid tube. A suitable hollow needle 36 is the type used in a hypodermic device.

The hollow needle 36 includes a hollow needle passageway or longitudinal hole 44 therethrough. The upper end 38 has an air fill exit opening 46 and the lower end 40 has an air fill entrance opening 48.

With the egg 14 having one hole 16 therein positioned on the egg seal 22, the upper end 38 of the hollow needle 36 extends outwardly from the egg sealing surface 28 and into the interior content 10 of the egg 14 as best shown in FIG. 2. It is preferred that the upper end 38 extend into the egg 14 between one half and two-thirds the length of the egg 14. The position of the upper end 38 is adjusted by sliding the hollow needle 36 in the hole 42 in third end cap portion 26c of the egg seal 22. It is noted that the adjustment is necessary since eggs vary in size. The apparatus may also be used for sparrow eggs and goose eggs which range from very small to very large in size.

Since the upper end 38 of the hollow needle 36 extends outwardly from the egg sealing surface 28 it serves as a means to guide the egg 14 onto the egg seal 22 so that the one hole 16 in the egg shell 12 is in alignment with the egg collection opening 32.

The egg collection means 20 includes a closure means or cap 50 for sealably mounting to a bottle 52 having a pressure below atmospheric pressure therein, and an egg collection fitting 54.

The cap 50 sealably mounts or attaches to the bottle 52. The cap 50 may attach with screw threads 56a and 56b. The cap 50 also may be formed as a flexible bottle stopper 50a as shown in FIG. 4.

The egg collection fitting 54 is formed as a 90 degree elbow as shown in FIGS. 1, 2 and 4. The egg collection fitting 54 includes a first egg collection fitting end 58 and a second egg collection fitting end 60. The first egg collection fitting end 58 sealably mounts through a first hole 62 in the cap 50 and extends downwardly from the cap 50. The second egg collection fitting end 60 is sealably mounted in a hole 64 in the second T-shaped portion 26b of the egg seal 22. The egg collection fitting 54 provides the second portion 30b of the egg collection passageway 30.

Figure 3:
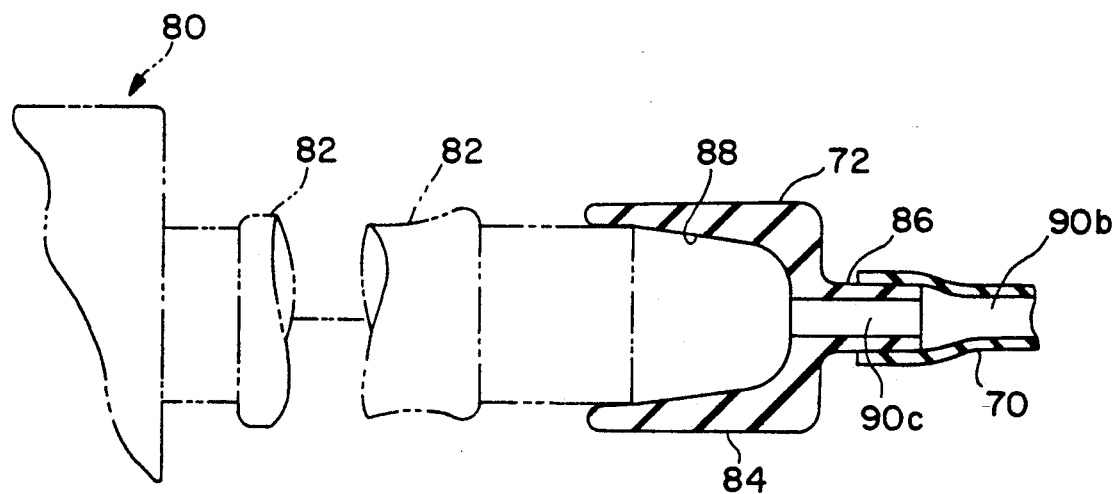
FIG. 3 is an enlarged view of a portion of the apparatus of FIG. 1 illustrating the vacuum cleaner hose connector and vacuum cleaner.

A supply passageway means 66 within a supply fitting 68, a supply tube 70 and a vacuum cleaner hose connector 72 provides a pressure below atmospheric pressure in the interior of the bottle 52. The supply fitting 68 includes a first supply fitting end 74 and a second supply fitting end 76. The first supply fitting end 74 sealably mounts through a second hole 78 in the cap 50 and extends downwardly. The preferred reduced pressure source is a vacuum cleaner 80. The vacuum cleaner 80 having a hose 82 as shown in FIG. 3 connects to the vacuum cleaner hose connector 72.

The vacuum cleaner hose connector 72 includes a first vacuum cleaner hose connector end portion 84 and a second vacuum cleaner hose connector end portion 86. The first end portion 84 is formed as a tapered hole 88 as best shown in FIG. 3. The tapered hole 88 is intended to provide a connection adaptable to different diameters of vacuum cleaner hose 82 as well as to provide easy insertion and sealing with the vacuum cleaner hose 82.

The interior of the bottle 52 connects to the reduced pressure source through the first passageway 90a in the supply fitting 68, the second passageway 90b in the supply tube 70 and the third passageway 90c in the vacuum cleaner hose connector 72.

To operate the apparatus the cap 50 is first sealably mounted to a bottle 52 and the vacuum cleaner hose 82 is inserted into the vacuum cleaner hose connector 72.

One hole 16 about 3 to 4 millimeters in diameter is formed in the bottom of an egg 14. The upper end 38 of the hollow needle 36 is positioned into the one hole 16 and the egg 14 is moved to contact the egg shell 12 against the egg sealing surface 28. The egg 14 is now in position to have the interior content 10 evacuated or removed. It is noted that the upper end 38 of the hollow needle 36 is between one-half and two-thirds into the egg 14. This prevents a short-circuit between the upper end 38 and the egg collection opening 32. A short-circuit occurs when the upper end 38 is too close to the egg collection opening 32. During a short-circuit a portion of the interior content 10 on the opposite end of the egg from the one hole 16 may not be removed.

The apparatus evacuates the interior content 10 by providing a pressure below atmospheric pressure in the interior of the bottle 52. The preferred reduced pressure is about 0.6 to 0.9 atmospheres. With the reduced pressure in the interior of the bottle 52 the atmospheric air pressure at the lower end 40 of the hollow needle 36 exerts pressure through the longitudinal hole 44 in the hollow needle 36 into the interior content 10. This atmospheric air pressure forces the interior content 10 out of the egg 14 through the one hole 16 into the egg collection opening 32 and through the egg collection passageway 30 into the bottle 52.

The evacuation or removal or clean-out of the interior content 10 of the egg 14 occurs when the interior of the bottle 52 has a pressure below atmospheric pressure. This occurs when the vacuum cleaner 80 is turned on. The vacuum cleaner 80 as is known provides a vacuum. A vacuum is defined as a pressure below atmospheric pressure. This reduced pressure is supplied through the third passageway 90c, in the vacuum cleaner hose connector 72, through the second passageway 90b in the supply tube 70, through the first passageway 90a in the supply fitting 68 and into the interior of the bottle 52. This reduced pressure also extends through the egg collection passageway 30.

Once the vacuum cleaner 80 is turned on, the interior content 10 flows into the bottle 52 until the egg shell 12 is empty. After the egg shell 12 is empty the vacuum cleaner 80 is turned off. At this time the bottle 52 with the collected interior content 10 may be removed.

A second embodiment of the apparatus is shown in FIG. 4. The second embodiment is similar to the preferred embodiment and can be used for both evacuation of the interior content 10 from an egg 14 and for flushing the egg shell 12. The second embodiment includes flushing means 92 for flushing the egg shell 12 with water once the interior content 10 is removed.

The flushing means 92 includes a hollow needle means 34a. The hollow needle means 34a includes a hollow needle 36a. The hollow needle 36a is mounted vertically as shown in FIG. 4. The upper end 38a is positioned about two-thirds into the egg 14. The lower end 40a is sufficiently long to permit inserting it into a cup 95 containing water 94. The hollow needle 36a has an outside diameter of about 0.060 inch, an inside diameter of about 0.040 inch and a length of about 6 inches. The hollow needle means 34a may also include a small flexible tube (not shown) which may be connected to the lower end 40a of the hollow needle 36a. This small flexible tube (not shown) may extend into the cup 95 of water 94. The small flexible tube will permit positioning the cup 95 of water 94 more distant from the apparatus.

In the second embodiment, the evacuation of the interior content 10 of the egg 14 is the same as in the preferred embodiment. The second embodiment also permits flushing of the interior of the egg shell 12 after the interior content 10 has been evacuated. In the evacuation of the interior content 10 the hollow needle 36a provides air fill of the egg 14 and in flushing with water the hollow needle 36a provides water fill of the egg 14. During flushing water 94 flows into and through the egg 14 to remove the residue of the interior content 10.

The water flushing of the residue of the interior content 10 of the egg 14 occurs when the interior of the bottle 52 has a pressure below atmospheric pressure. This occurs when the vacuum cleaner 80 is turned on as previously described.

Once the vacuum cleaner 80 is turned on, the water 94 flows into the bottle 52 until the water 94 at the lower end 40a of the hollow needle 36a is exhausted. After the water 94 in the cup 95 is used, air continues to flow through the empty egg shell 12 and into the bottle 52. This drys the interior of the egg shell 12. At this time the egg shell 12 is flushed and ready for decorating.

The egg evacuation and flushing apparatus is very simple to operate and when used by children and adults alike it provides entertainment in operation as well as a quick and efficient removal of the content of an egg and flushing of the empty egg shell 12. The egg shell 12 then becomes an object which can be decorated and used. The one hole 16 in the bottom of the empty egg shell 12 can generally be hidden from view when the egg shell 12 is used for decorative purposes. Although it is described that the one hole 16 is in the bottom of the egg shell 12 it can be in any location on the egg shell to practice the present invention.

While embodiments and application of the invention have been described and shown, it would be apparent to those skilled in the art that modifications are possible without departing from the invention concepts herein. Therefore, the invention is not to be restricted other than by the scope and equivalence of the following claims.

I claim:

1. An apparatus for removal of the interior content of an egg from the egg shell of an egg having only one hole preformed in the egg shell comprising
    closure means for sealably mounting to a container,
    means for removing the interior content of the egg through only one hole in the egg shell to said closure means, said means for removing the interior content of an egg including
        an egg seal having an egg collection opening therein connecting with said only one hole in said egg shell,
    air fill hollow tube means positioned through said egg seal and inserted into said interior content of said egg through said only one hole in the egg shell for supplying an atmospheric pressure therethrough into said egg shell,
    egg collection passageway means for collecting said interior content of said egg connecting between said egg collection opening in said egg seal and said closure means, and
    supply passageway means for providing a source of air pressure below atmospheric pressure connecting with said closure means.

2. The apparatus defined in claim 1 wherein said supply passageway means further includes a vacuum hose connector whereby a vacuum cleaner may be connected to said supply passageway means.

3. An apparatus for evacuating the interior content of an egg having only one hole in the egg shell comprising
    means for providing an air pressure below atmospheric pressure on said only one hole in said egg shell for removal of the interior content of said egg,
    air fill tube means for inserting into said only one hole in said egg shell for providing air at atmospheric pressure into said egg shell, and
    an egg seal having a collection hole therein positioned adjacent said hole in said egg shell whereby said interior content flows directly from said one hole in said egg shell into said collection hole in said egg seal.

4. The apparatus defined in claim 3 wherein said collection hole in said egg seal is larger than said one hole in said egg shell.

5. The apparatus defined in claim 3 wherein said air fill hollow tube means is smaller in diameter than said collection hole in said egg seal, said hollow tube means extending upwardly from said collection hole into said hole in said egg shell.

* * * * *